US008273391B2

(12) United States Patent
Hüllmann

(10) Patent No.: US 8,273,391 B2
(45) Date of Patent: Sep. 25, 2012

(54) METHOD FOR PRODUCING CHEESE

(75) Inventor: Markus Hüllmann, Rheda-Wiedenbrück (DE)

(73) Assignee: GEA Westfalia Separator GmbH, Oelde (DE)

( * ) Notice: Subject to any disclaimer, the term of this patent is extended or adjusted under 35 U.S.C. 154(b) by 376 days.

(21) Appl. No.: 12/519,534

(22) PCT Filed: Dec. 18, 2007

(86) PCT No.: PCT/EP2007/064139
§ 371 (c)(1),
(2), (4) Date: Aug. 24, 2009

(87) PCT Pub. No.: WO2008/074802
PCT Pub. Date: Jun. 26, 2008

(65) Prior Publication Data
US 2010/0092607 A1    Apr. 15, 2010

(30) Foreign Application Priority Data
Dec. 18, 2006   (DE) .......................... 10 2006 059 713

(51) Int. Cl.
*A23C 9/12* (2006.01)
(52) U.S. Cl. ............. 426/36; 426/34; 426/491; 426/582
(58) Field of Classification Search ............. 426/34, 426/36, 478, 490, 491, 580, 582
See application file for complete search history.

(56) References Cited

U.S. PATENT DOCUMENTS

| 2,025,213 A | * | 12/1935 | Miollis .......................... 426/478 |
| 2,366,553 A | * | 1/1945 | Petersen .......................... 426/36 |
| 2,871,126 A | * | 1/1959 | Smith et al. ..................... 426/36 |
| 3,078,170 A | * | 2/1963 | Leber ............................. 426/36 |
| 3,693,256 A | * | 9/1972 | Joux et al. ...................... 99/459 |
| 4,713,254 A |   | 12/1987 | Childs et al. |
| 4,946,698 A | * | 8/1990 | Zettier et al. .................. 426/495 |
| 2002/0016245 A1 |   | 2/2002 | Zettier |
| 2004/0224069 A1 |   | 11/2004 | Aird et al. |

FOREIGN PATENT DOCUMENTS

| DE | 26 36 882 A1 | 2/1978 |
| DE | 39 24 372 C1 | 11/1990 |
| DE | 200 10 743 U1 | 11/2000 |
| EP | 0 351 539 A2 | 1/1990 |
| EP | 0 440 208 A1 | 8/1991 |
| EP | 1 642 494 A1 | 4/2006 |

OTHER PUBLICATIONS

C.M. Shah, "Dewatering of Casein Curd—A Review", Indian Dairyman, vol. 39:10, (1987).

* cited by examiner

*Primary Examiner* — Leslie Wong
(74) *Attorney, Agent, or Firm* — Barnes & Thornburg LLP

(57) ABSTRACT

The present disclosure relates to a method for producing cheese in which the method includes the steps of: providing dairy milk, which could be a skimmed milk and cream mixture; producing a gel-type curd/whey mixture by coagulation; and cutting the curd/whey mixture in a cheese processor such that the whey flows out of the curd.

24 Claims, 1 Drawing Sheet

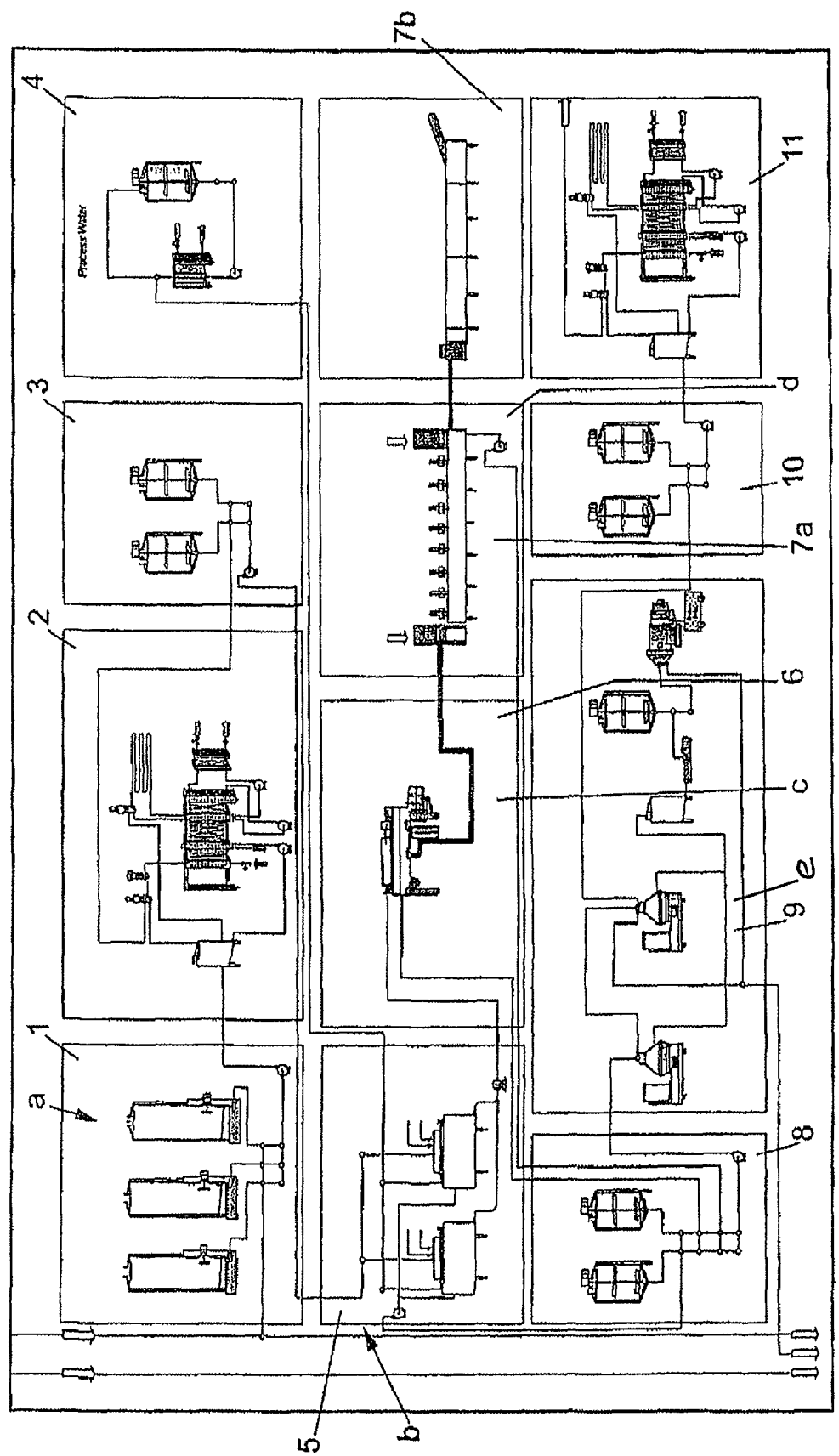

METHOD FOR PRODUCING CHEESE

This application is a 371 of PCT/EP2007/064139, filed Dec. 18, 2007.

BACKGROUND AND SUMMARY

The present disclosure relates to a method for producing cheese in which the method includes the steps of: providing dairy milk, which could be a skimmed milk and cream mixture; producing a gel-type curd/whey mixture by coagulation; and cutting the curd/whey mixture in a cheese processor such that the whey flows out of the curd.

A method of this type is known from the state of the art. As noted above, a dairy milk, or skimmed milk/cream mixture, is first coagulated in cheese processors, which may take place, for example, by means of Lan and by using small amounts of $CaCl_2$. Frequently, for influencing the taste of the end product, a concentrate of cultures is also added to the dairy milk, and β-carotene is added to the dairy milk for coloring.

After the coagulation, which usually takes approximately 30 minutes, a gel or gelatin is formed by a splitting into para-kappa casein and lyco macro peptide, which consists of curd and whey.

During the mechanical processing, this gelatin is cut to approximately a fingernail size, depending on the type of cheese, by especially configured stirring and cutting blades in cheese processors.

In this case, whey, or cheese water, is drained and suctioned off from the cheese processors. It is removed and partially replaced by warm to hot water for reducing the solid non-fat contents.

The curd/whey mixture is now carefully conveyed by way of a recipient device into receptacles, or pre-pressing vats or casomatics.

The curd compressed in this manner is now conveyed downward by static pressure and the whey is decanted in the upward direction.

The thus obtained curd is then decanted at the bottom end of these receptacles into molds and is subsequently, usually before the adding of salt, pressed into cheese molds.

After this pressing and a salting, the finished cheese blocks are either packaged in foil or, under special climatic conditions, arrive in aging spaces. After an aging and the commercial packaging, the cheese will be ready for consumption.

This method has been successful as far as it goes. However, it can be improved in such a manner that losses of whey will be reduced and the whey quality will be improved.

The present disclosure addresses solving the above-noted problem of losses of whey and improvement of the whey quality.

The present disclosure relates to a method for producing cheese and a method for producing cheese and whey.

The method for producing cheese comprises the method steps of: a) providing a decanter; b) providing dairy milk from which a gel-type curd/whey mixture is produced by coagulation; c) cutting the curd/whey mixture in a cheese processor such that whey from the curd/whey mixture flows out of the curd; d) conveying the curd into the decanter; e) separating the curd in the decanter into a drained curd and whey; and f) pressing the drained curd, thereby producing the cheese. The method for producing cheese and whey comprises the method steps of: a) providing a decanter; b) providing dairy milk from which a gel-type curd/whey mixture is produced by coagulation; c) cutting the curd/whey mixture in a cheese processor such that whey from the curd/whey mixture flows out of the curd; d) conveying the curd into the decanter; and e) separating the curd in the decanter into a drained curd and whey such that a fraction of centrifugeable solids in the whey is less than 0.3%.

The methods according to the present disclosure, replace receptacles which are required, according to the state of the art, for the curd/cheese mixture for decanting curd by decanters, or solid-bowl worm centrifuges. Although the use of a decanter is known in the milk processing field, i.e., from a method of producing curd cheese bars, its use in the methods of the present invention had not been considered before, even though it has clear advantages in comparison with the known method of using pressing vats. Thus, decanters permit a simple and largely constant optimal adjustment of the solid non-fat contents, which leads to a reduction of the losses of whey. On the whole, this also results in an optimal quality of the whey, which is an indicator of a good cheese production process. Because of its high-grade, the whey can also be further processed in a high-quality manner.

The inflow quantity, the rotational speed and/or the differential rotational speed of the decanter are controlled as a function of the quality of the clear phase, or whey. This is done such that, relative to the separating process, a fraction of centrifugeable solids, i.e., the so-called cheese dust, is obtained is as low as possible. Cheese dust fractions of the whey may be less than 0.3%, or may be less than 0.2%. Larger quantities of very fine cheese particles result in yield losses and lead to diverse problems in the further processing of the whey, such as clogged filters and membranes and insufficient whey skimming. These problems can be avoided by the methods according to the present disclosure.

The use of a two-transmission drive with a differential rotational speed adjustment also appears particularly suitable. The use of a two-transmission drive with a differential rotational speed adjustment therefore is advantageous because a simple and precise controlling of the differential rotational speed can be carried out during the operation.

In addition, it is advantageous for the decanter to be provided with a throttling device in the area of its liquid outlet, which throttling device permits a partial throttling of this liquid outlet. Particularly, when such a decanter is used, the quality of the whey will be optimal and the content of cheese dust will be low. Throttling disks and/or a centripetal pump construction, for example, are suitable for a use as throttling devices. These variants ensure optimal process characteristics as do devices possibly connected on the output side. Such devices may comprise whey clarification separators, whey skimming separators and/or filtration devices for the production of high-quality whey protein concentrates.

Furthermore, as a result of the use of the decanter, the space requirement is also reduced in comparison to the known solutions.

An additional advantage applies to the energy consumption.

The hygienic conditions are also improved, particularly when a sanitary construction, such as a USDA construction, is used.

Other aspects of the present disclosure will become apparent from the following descriptions when considered in conjunction with the accompanying drawings.

BRIEF DESCRIPTION OF THE DRAWINGS

FIG. 1 schematically illustrates a method for producing cheese and whey, according to the present disclosure.

DETAILED DESCRIPTION

As suggested in FIG. 1, beginning at Step a, which includes Blocks 1, 2 and 3, dairy milk is coagulated in cheese processors, which produces a gelatin including curd and whey.

For separating the whey, the curd is first cut by specially configured stirring and cutting blades in cheese processors, as suggested in Step b of FIG. 1. During this process, a portion of the whey is already drained from the cheese processors and is suctioned off from the cheese processors. That portion of the whey is removed and is partially replaced by warm to hot water for reducing the solid non-fat contents, as suggested in Blocks 4 and 5 of FIG. 1.

The curd/whey mixture pre-cut in this manner is conveyed into a decanter, as suggested in Step c, where additional whey is separated from the curd, as suggested in Block 6 of FIG. 1.

In the decanter, it is possible to control the inflow quantity, the rotational speed and/or the differential rotational speed as a function of the quality of the clear phase, or the whey.

In addition, it is advantageous to carry out a control of the inflow quantity, of the rotational speed and/or of the differential rotational speed as a function of a recorded torque in order to compensate quality differences in the inflow.

The curd conveyed from the decanter is pressed as solids directly into cheese molds, usually before a salting, as suggested at Step d in FIG. 1. After the pressing and salting, the finished cheese blocks are either packaged in foil or, under special climatic conditions, arrive in aging spaces. After an aging and the commercial packaging, the cheese will be ready for consumption, as suggested in Blocks 7a and 7b of FIG. 1.

In contrast, the whey can be collected in collecting tanks, as suggested in Block 8 of FIG. 1 and can then be further processed in additional devices, such as separators and decanters, as suggested at Step e and Block 9 of FIG. 1. In such a case, cream is separated from the curd and is processed, as suggested at Blocks 10 and 11 of FIG. 1. The whey will be of a sufficiently high grade for a high-quality further processing.

"Sufficiently high grade" of the clear phase means that less than 0.3%, or less than 0.2% centrifugeable solids are contained in the whey.

The decanter is moved in such a manner that the solid non-fat contents of the cheese will be between 40 and 50%, depending on the type of cheese.

The decanter advantageously also has a sanitary design, where all areas contacting the product includes stainless steel, and where the construction is designed to be largely free of gaps, particularly also in the area of seals.

It is within the scope of the present invention that a decanter may also be used wherein a disk stack is connected to the output side of its worm in the direction of the liquid discharge in order to remove further solids from the whey (not shown).

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A method of producing cheese, the method steps, in the following sequence, comprising:
   a) providing a decanter;
   b) providing dairy milk from which a gel-type curd/whey mixture is produced by coagulation;
   c) cutting the gel-type curd/whey mixture in a cheese processor such that whey from the gel-type curd/whey mixture flows out of the curd;
   d) conveying the resulting gel-type curd/whey mixture into the decanter;
   e) separating the curd in the decanter into a drained curd and whey; and
   f) pressing the drained curd, thereby producing the cheese.

2. The method according to claim 1, further comprising the step of controlling a content of solid matter of the curd by a throttling device of the decanter and a control device.

3. The method according to claim 2, wherein the throttling device is a throttling disk.

4. The method according to claim 1, wherein the decanter includes a two-transmission drive.

5. The method according to claim 1, wherein an inflow quantity of the curd conveyed into the decanter is controlled as a function of the quality of the whey.

6. The method according to claim 1, wherein a rotational speed of the decanter is controlled as a function of the quality of the whey.

7. The method according to claim 1, wherein a differential rotational speed of the decanter is controlled as a function of the quality of the whey.

8. The method according to claim 5, wherein a fraction of centrifugeable solids in the whey amounts to less than 0.3%.

9. The method according to claim 5, wherein the controlling of the inflow quantity is a function of a recorded torque.

10. The method according to claim 1, wherein the decanter is operated such that solid non-fat contents of the cheese amounts to between 40 and 50%.

11. The method according to claim 1, wherein the decanter includes a sanitary design.

12. The method according to claim 1, wherein a disk stack is connected to an output side of the decanter in a direction of a liquid outlet in order to remove solids from the whey.

13. A method of producing cheese and whey, the method steps, in the following sequence, comprising:
   a) providing a decanter;
   b) providing dairy milk from which a gel-type curd/whey mixture is produced by coagulation;
   c) cutting the gel-type curd/whey mixture in a cheese processor such that whey from the curd/whey mixture flows out of the curd;
   d) conveying the resulting gel-type curd/whey mixture into the decanter; and
   e) separating the curd in the decanter into a drained curd and whey such that a fraction of centrifugable solids in the whey is less than 0.3%.

14. The method according to claim 1, wherein the decanter is a solid-bowl worm centrifuge.

15. The method according to claim 2, wherein the throttling device is a centripetal pump.

16. The method according to claim 6, wherein a fraction of centrifugeable solids in the whey amounts to less than 0.3%.

17. The method according to claim 7, wherein a fraction of centrifugeable solid in the whey amounts to less than 0.3%.

18. The method according to claim 5, wherein a fraction of controllable solids in the whey amounts to less than 0.2%.

19. The method according to claim 6, wherein a fraction of controllable solids in the whey amounts to less than 0.2%.

20. The method according to claim 7, wherein a fraction of controllable solids in the whey amounts to less than 0.2%.

21. The method according to claim 6, wherein the controlling of the rotational speed is a function of a recorded torque.

22. The method according to claim 7, wherein the controlling of the differential speed is a function of a recorded torque.

23. The method according to claim 1, wherein the dairy milk is a mixture of skimmed milk and cream.

24. The method according to claim 13, wherein the dairy milk is a mixture of skimmed milk and cream.

* * * * *